United States Patent Office 3,420,342
Patented Jan. 7, 1969

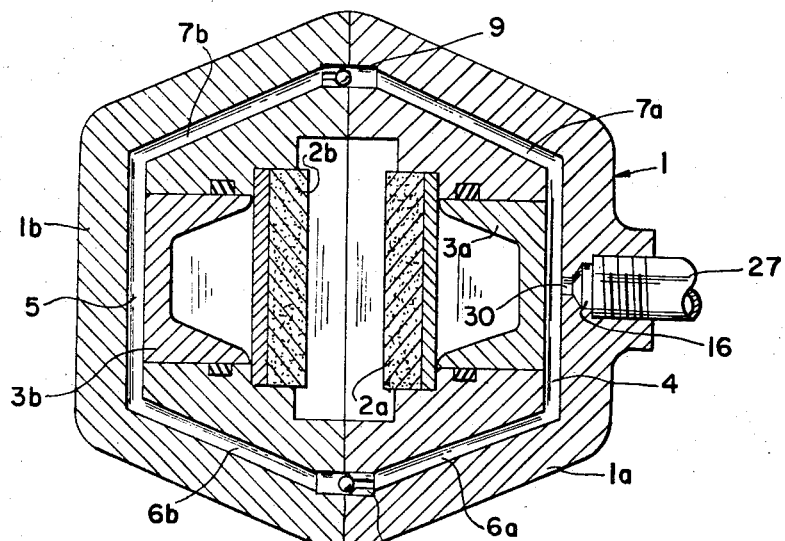
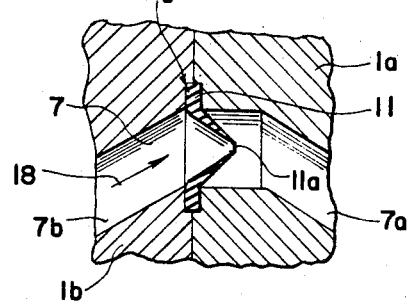
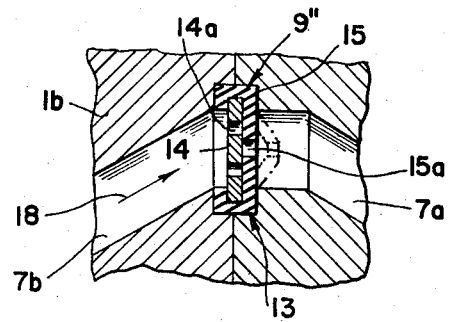
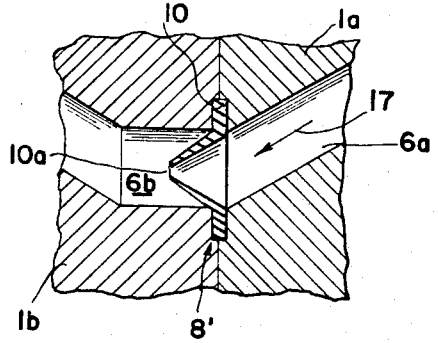
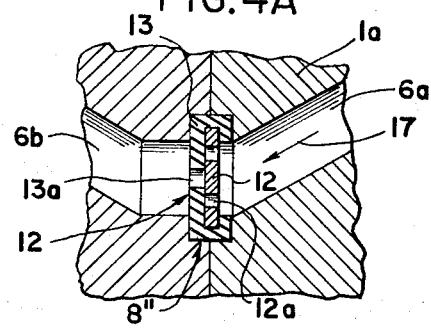

3,420,342
ACTUATING FLUID COOLING MEANS FOR A DISK BRAKE
John Redvers Botterill, Solihull, England, assignor to Alfred Teves Maschinen- und Armaturenfabrik KG., Frankfurt am Main, Germany, a company of Germany
Filed Mar. 10, 1967, Ser. No. 627,584
Claims priority, application Germany, Mar. 10, 1966, T 30,629
U.S. Cl. 188—264
Int. Cl. F16d 65/84
6 Claims

ABSTRACT OF THE DISCLOSURE

The invention relates to a hydraulic disk brake for automotive vehicles and the like wherein a yoke, mounted by one leg on a fixed support, straddles a rotating disk. A pair of aligned cylinders, whose pistons carry brake lining and are hydraulically movable toward and away from the intervening disk, are connected by a fluid circuit. Brake fluid is admitted in the vicinity of one cylinder near the junction of the yoke with the fixed support and passes partly into this one cylinder through a short direct passage and partly through the opposite cylinder via an internal channel system within the yoke which includes a first conduit containing a check valve for unidirectional flow toward that remote cylinder and a second conduit containing a check valve for the unidirectional return of fluid from the latter cylinder to the inlet. Such a circuit promotes the cooling of the brake fluid traveling within the yoke and prevents the formation of gas pockets due to fluid evaporation.

---

My present invention relates to a hydraulic spot-type disk brake, e.g., as used in automotive vehicles, wherein a movable element such as a disk is disposed between two aligned brake cylinders whose pistons, carrying the usual brakeshoes, are concurrently movable toward and away from that element.

In automotive disk brakes of this description it is known to provide a yoke whose legs straddle a portion of the disk periphery and form the two hydraulic cylinders, one of the legs being fixedly supported on the axle housing and therefore on the vehicular chassis, the other leg being cantilevered between the disk and a tire-carrying wheel disk secured to an extremity of the brake-disk shaft. The yoke, generally made in two substantially symmetrical parts which are detachably bolted together to facilitate assembly and disassembly, is internally channeled to form a conduit for the flow of brake fluid between the two cylinders, the fluid being admitted through an inlet on the supported leg of the yoke which communicates directly with the proximal cylinder and through the internal conduit with the remote cylinder.

In operation, especially upon prolonged or repetitive braking, the brake linings and their pistons undergo considerable heating; the resultant rise in the temperature of the cylinders tends to vaporize some of the brake fluid, particularly in the wheel-side cylinder remote from the inlet where heat is not dissipated into the surrounding structure as effectively as on the supported side. This leads to the formation of gas bubbles which may develop into vapor pockets in the connecting conduit within the yoke with resulting impairment of the response of the wheel-side piston to changes in the pressure of the operating fluid.

The general object of this invention is to provide a hydraulic brake of the character described in which this inconvenience is avoided.

A more particular object of my invention is to provide means in such brake to intensify the cooling of overheated brake fluid, particularly in the cylinder and conduit sections remote from the inlet.

The above objects are realized, pursuant to the present invention, by the provision of two separate conduits extending within the yoke between the inlet and the remote cylinder, these conduits being internally provided with respective unidirectionally effective valve means allowing the brake fluid to flow into the remote cylinder through one of these conduits only and to return to the inlet and/or the proximal cylinder solely through the other conduit. This arrangement insures a circulation of the working liquid in one sense only, whereby cooling takes place more rapidly and any residual gas occlusions are propelled toward the cooler inlet region where they will either recondense or move toward the reservoir through the relatively wide supply line without interfering with the operation of the brakeshoes.

This circulation is enhanced, according to a further feature of my invention, by disposing the two conduits at different levels (with respect to the horizontal) and so orienting their check valves that the return to the inlet occurs through the higher-level conduit toward which the heated fluid and vapors from the remote cylinder gravitate, the fluid supply in that cylinder being replenished by cooler liquid passing through the lower conduit. The system then constitutes what may be described as a thermal syphon, particularly under conditions of extreme frictional heat generation.

Since the check valves used to control the circulation need not be absolutely fluidtight in the reverse direction and also are not subjected to high reverse pressures, I prefer to construct them of light-weight and inexpensive materials such as resilient membranes (e.g., rubber disks) which can be readily replaced upon disassembly of the two yoke halves.

The invention will be described in greater detail with reference to the accompanying drawing in which:

FIG. 2 is a cross-sectional view of the brake proper taken generally on the line II—II of FIG. 1; and FIGS. 3A, 3B, 4A and 4B are enlarged sectional detail views showing preferred constructions of check valves to be used in the arrangement of FIG. 2.

Figure 1:
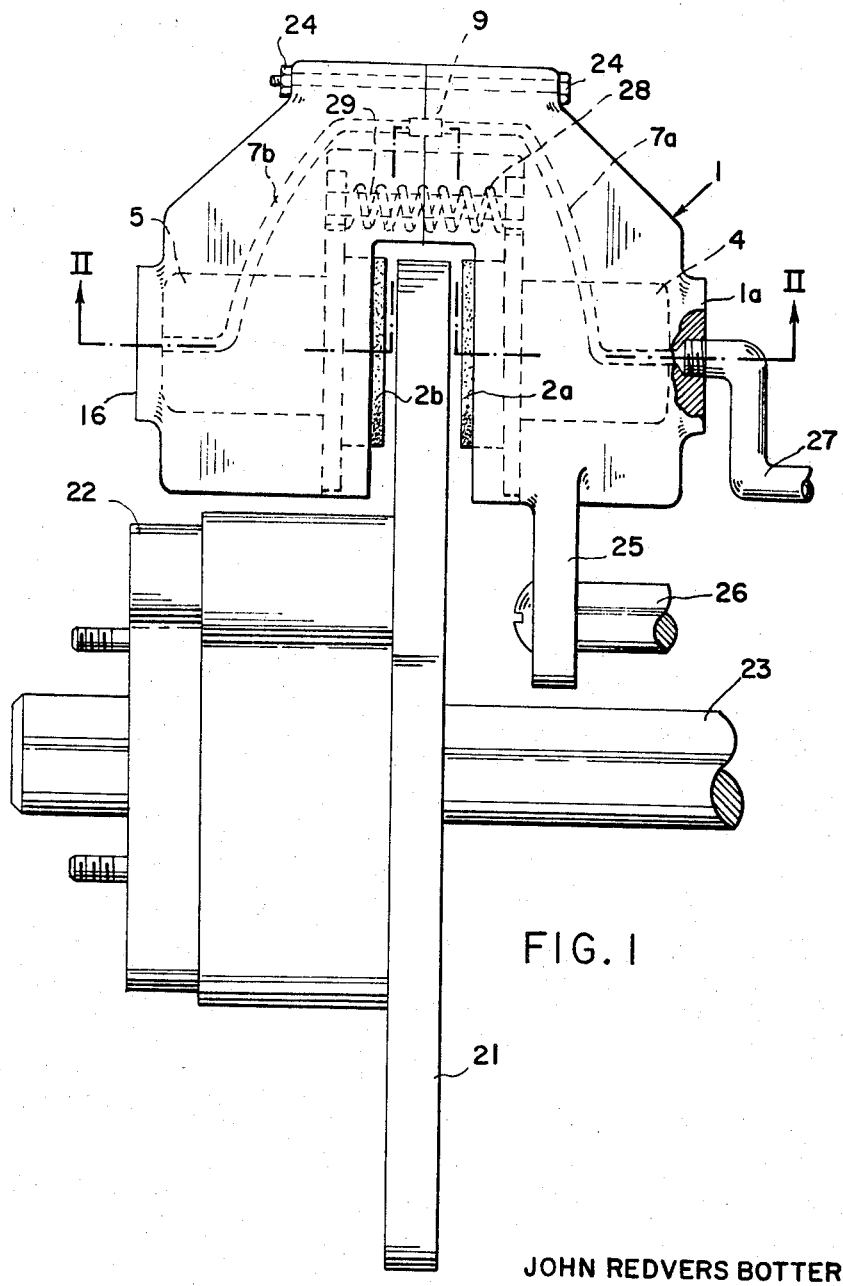
FIG. 1 is a top plan view of a vehicular shaft with an associated disk-brake assembly embodying the invention.

Reference will first be made to FIG. 1 which illustrates a yoke 1 of a hydraulic brake straddling a disk 21 whose hub 22 is rigid with a shaft 23 of an automobile wheel not shown. Yoke 1 consists of two halves 1a, 1b held together by bolts 24. An extension 25 of leg 1a is secured to a fixed support 26 forming part of a surrounding axle housing not further illustrated. Brake fluid is supplied to the interior of yoke 1, in a manner more fully described hereinafter, via a feed pipe 27 terminating at the supported leg 1a. Brakeshoes 2a and 2b project from the yoke on opposite sides of disk 21 for concurrent movement toward and away from the disk periphery under the control of the admitted brake fluid which, in a manner not further described but known per se, is controlled by a brake pedal or similar actuator via a master cylinder. A spring 28 on a pin 29 tends to maintain the brake shoes 2a, 2b separated from the disk surfaces in the absence of overriding fluid pressure.

In FIG. 2, I have shown the inner construction of yoke 1 whose halves 1a, 1b form two cylinders 4, 5 for the displacement of confronting pistons 3a, 3b, bearing upon brakeshoes 2a and 2b, respectively. Inlet 16, communicating with supply pipe 27, opens via a short passage 30 into cylinder 4 which is proximal to that inlet and is formed by yoke half 1a mounted on the support 26 (FIG. 1).

Two channels extend from cylinder 4 to cylinder 5 to form conduits for the circulation of brake fluid therebetween, i.e., a lower conduit with descending branch 6a and ascending branch 6b, incorporating a check valve 8 at the junction of these branches, and an upper conduit with ascending branch 7b and descending branch 7a, also containing a check valve 9 at their junction. The check valves 8 and 9 are oppositely oriented so that fluid can pass virtually unhindered from cylinder 4 and inlet 16 to cylinder 5 via the lower conduit 6a, 6b as well as from cylinder 5 to cylinder 4 and inlet 16 via the upper conduit 7b, 7a, the reverse flow being substantially blocked.

In operation, if the fluid in cylinder 5 overheats and partly vaporizes, the vapors will rise along with the hot fluid into the branch 7b for return to inlet 27 as soon as the fluid pressure in inlet 27 abates sufficiently to let the spring 28 (FIG. 1) withdraw the brakeshoes 2a, 2b from disk 21. Upon outward movement of piston 3b, the liquid column in conduit 7b, 7a is pushed toward cylinder 4 and its fluid, together with that displaced by the retreating piston 3a, partly returns to the line 27 leading to the master cylinder. Upon the next operating stroke, fluid readmitted through inlet 16 displaces the pistons 3a and pushes the liquid column in conduit 6a, 6b toward cylinder 5 to advance the piston 3b simultaneously therewith. Thus, the working liquid is made to circulate unidirectionally in the channel system 6a, 6b, 7b, 7a whenever the brake is actuated.

In FIGS. 3A, 3B I have shown one type of valve 8', 9' suitable for use as the check valves diagrammatically indicated at 8 and 9 in FIG. 2. Valves 8' and 9' each comprise a funnel-shaped resilient membrane 10 and 11, respectively, e.g., a rubber disk which has a narrow orifice 10a or 11a at the neck of the funnel capable of widening in response to unidirectional fluid pressure, i.e., pressure from the direction of conduit branch 6a (arrow 17 in FIG. 3A) and from the direction of fluid branch 7b (arrow 18 in FIG. 3B).

In an alternative construction, valves 8" and 9" may be used as shown in FIGS. 4A and 4B. Valve 8" consists of a rigid disk 12 with eccentric apertures 12a normally obstructed by a resilient annular membrane 13, such as a rubber washer, having a central opening 13a offset from the apertures 12a; again, fluid pressure in the direction indicated by arrow 17 unblocks the valve. In an analogous manner, valve 9" consists of a rigid disk 17 with eccentric apertures 14a juxtaposed with a resilient membrane 15 having a central opening 15a, this valve yielding to fluid pressure in the direction indicated by arrow 18.

It will be noted that the valves illustrated in FIGS. 3A, 3B, 4A and 4B can be conveniently clamped between yoke portions 1a and 1b at the junctions of the ascending and descending branches of the respective conduits.

I claim:
1. A hydraulic disk brake for an automotive vehicle having a brake support, said brake comprising:
   a rotatable brake disk;
   a brake yoke having a pair of legs straddling the periphery of said disk and secured at one of said legs to said support;
   a pair of cylinders respectively formed in said legs and opening in the direction of respective sides of said disk;
   respective pistons slidably received in said cylinders;
   a respective brakeshoe interposed between each of said pistons and the respective side of said disk for displacement thereagainst upon introduction of brake fluid under pressure into said cylinders;
   first and second independent ducts formed in said yoke and interconnecting said cylinders behind the respective pistons relative to said disk;
   oppositely oriented unidirectional first and second check valves respectively positioned in said first and second ducts within said yoke for sustaining fluid circulation to the cylinder of the other leg of said yoke along said ducts; and
   inlet means connected with the cylinder of said one of said legs for delivering brake fluid thereto for actuation of the brake, said inlet means constituting the sole passage for brake-fluid flow into and out of said cylinders during operation of the brake.

2. The hydraulic disk brake defined in claim 1 wherein said first and second ducts are disposed at a lower and a higher level respectively with respect to the axis of rotation of the disk, said check valves being oriented to allow fluid from said inlet means to flow to said other of said cylinders via said first duct and from said other of said cylinder to said inlet means via said second duct only.

3. The hydraulic disk brake defined in claim 2 wherein said yoke is composed of a pair of yoke halves adjoining at a contact region, each of said ducts having an ascending branch in one of the yoke halves and a descending branch in the other of the yoke halves communicating at a respective junction of the branches at said contact region, said check valves being disposed at the junction of the respective ducts.

4. The hydraulic disk brake defined in claim 3 wherein said check valves are clamped between said yoke halves at said contact region.

5. The hydraulic disk brake defined in claim 4 wherein said check valves consist of funnel-shape membranes.

6. The hydraulic disk brake defined in claim 4 wherein said check valves each comprise an apertured rigid plate and a resilient annular membrane juxtaposed therewith.

References Cited

UNITED STATES PATENTS

| 996,588 | 6/1911 | Kennedy | 137—525.1 X |
| 2,875,776 | 3/1959 | Skipwith | 137—525.1 X |
| 3,055,456 | 9/1962 | Pfeiffer | 188—152.873 X |

FOREIGN PATENTS

| 1,001,791 | 10/1951 | France. |
| 951,754 | 3/1964 | Great Britain. |

GEORGE E. A. HALVOSA, *Primary Examiner.*

U.S. Cl. X.R.

137—525.1